United States Patent [19]

Togashi et al.

[11] Patent Number: 5,258,439

[45] Date of Patent: Nov. 2, 1993

[54] FLAME-RETARDANT NYLON RESIN COMPOSITION

[75] Inventors: Osamu Togashi; Hideyuki Umetsu, both of Nagoya; Masatoshi Iwamoto, Aichi, all of Japan

[73] Assignee: Toray Industries, Inc., Japan

[21] Appl. No.: 652,835

[22] Filed: Feb. 8, 1991

[30] Foreign Application Priority Data

Feb. 19, 1990 [JP] Japan .................................. 2-37998

[51] Int. Cl.$^5$ ........................... C08J 5/10; C08K 3/10; C08K 3/16; C08L 77/10
[52] U.S. Cl. .................................. 524/411; 524/409; 524/412; 524/430; 524/431; 524/432
[58] Field of Search ............... 524/409, 411, 412, 430, 524/431, 432

[56] References Cited

U.S. PATENT DOCUMENTS

4,760,114 7/1988 Haaf et al. .................... 524/153
4,970,255 11/1990 Reimann et al. ................ 524/321

*Primary Examiner*—Paul R. Michl
*Assistant Examiner*—U. K. Rajguru
*Attorney, Agent, or Firm*—Austin R. Miller

[57] ABSTRACT

A flame retardant nylon polymer moulding composition comprises a 6T/66 copolyamide or 6T/6 copolyamide and a specific flame-retardant and auxiliary flame-retardant. The composition can be made into molded items for electric and electronic parts, automotive parts, and housing owing to their high degree of flame retardancy, good external appearance, and good heat resistance.

7 Claims, No Drawings

FLAME-RETARDANT NYLON RESIN COMPOSITION

BACKGROUND OF THE INVENTION

The present invention relates to a flame-retardant nylon polymer moulding composition, hereinafter referred to as a nylon resin composition which exhibits a good stability when it is in a molten state. More particularly, it is concerned with a flame-retardant nylon resin composition which, owing to its good stability in a molten state, resists heat encountered during soldering and does not suffer decomposition and degradation during melt molding.

A nylon improves in heat resistance as its melting point rises. On the other hand, a nylon with a high melting point needs a high processing temperature which causes decomposition and degradation during melt-molding, giving rise to molded items having a poor appearance.

Thus, it is difficult to obtain both a high heat resistance and ease of processing. We can attempt to overcome these difficulties, various compositions have been proposed which contain a polyamide copolymer and a flame retardant.

It is known that a polyamide copolymer having good heat resistance and moldability is obtained by copolymerizing hexamethylene terephthalamide and hexamethylene adipamide or by copolymerizing hexamethylene terephthalamide and caproamide (see JP-A-206827/1985, JP-A-159422/1986, and JP-A-283653/1986). Nylon resin compositions used in the electric and electronic industries are required to meet the UL-94 standard for a high degree of flame retardance (established by the Underwriters Laboratories in the U.S.). To this end, a variety of halogen-based flame-retardants have been proposed. It is known to incorporate, in a polyamide a brominated polystyrene as a flame-retardant and additionally a metal oxide as an auxiliary flame-retardant. (see JP-A-47044/1976 and JP-A-1403/1976). In addition, JP-A-116054/1979 discloses a composition composed of nylon and a brominated polyphenylene ether and attempts to improve this composition by incorporation of further additives are disclosed JP-A-23260/1987 and JP-A-138264/1989.

SUMMARY OF THE INVENTION

We have conducted research into the development of a flame-retardant composition which can be made into a molded item having high heat resistance and flame retardancy and also taking on a good appearance free of blooming.

As the result of these investigations, it was found that the above-mentioned problems can be solved if a specific nylon is combined with a specific flame-retardant, auxiliary flame-retardant, and inorganic reinforcing agent.

Thus, the present invention provides a flame-retardant nylon resin composition which comprises:

(A) 30-90% by weight of copolymer nylon composed of 80-20% by weight of hexamethylene terephthalamide unit and 20-80% by weight of hexamethylene adipamide unit or caproamide unit, (B) 5-35% by weight of flame-retardant based on halogenated polystyrene or halogenated polyphenylene ether containing 50-70% by weight of halogen and having a weight-average molecular weight higher than 5000, (C) 1-10% by weight of at least one kind of auxiliary flame-retardant selected from the group consisting of antimony oxide, sodium anitimonate, tin oxide, iron oxide, and zinc oxide, and (D) 0-50% by weight of reinforcing agent.

DESCRIPTION OF THE PREFERRED EMBODIMENT

In a resin composition according to the present invention, the nylon copolymer (designated as component (A) above) is composed of 80-20% by weight of units derived from hexamethylene terephthalamide and 20-80% by weight of units derived from hexamethylene adipamide and/or caproamide. This nylon copolymer includes a polyamide copolymer (referred to hereinafter as 6T/66 copolyamide) which may be formed by the copolymerization of hexamethylene ammonium terephthalate with hexamethylene ammonium diadipate, or a polyamide copolymer (referred to hereinafter as 6T/6 copolyamide) which may be formed by the copolymerization of hexamethylene ammonium terephthalate with ε-caprolactam or 6-aminocaproic acid or both. In the case of 6T/66, the ratio (by weight) of copolymerization i.e., 6T:66, should be from 80:20 to 20:80, preferably from 65:35 to 25:75, and more preferably from 59:41 to 30:70. In the case of 6T/6, the ratio (by weight) of copolymerization i.e., 6T:6, should be from 80:20 to 20:80, preferably from 78:22 to 45:55, and more preferably from 78:22 to 60:40. With the 6T component less than 20 % by weight, the copolymer polyamide has a low melting point and hence is poor in heat resistance. Conversely, with the 6T component in excess of 80% by weight, the copolymer polyamide has a high melting point and hence has improved heat resistance, but needs a high processing temperature, which leads to the thermal decomposition of the polymer. The 6T/66 and 6T/6 copolyamides is not particularly limited. Those having a relative viscosity of 1.5 to 5.0 (measure in 1% sulfuric acid solution at 25° C.) are particularly useful.

The resin composition of the present invention should contain 6T/66 copolyamide or 6T/6 copolyamide in an amount of 35-80% by weight, preferably 40-80% by weight, by weight to the total weight of the composition. With an amount less than 30% by weight, the resin composition is poor in mechanical strength (such as impact resistance). Conversely, with an amount in excess of 80% by weight, the resin composition is not so good in heat resistance, stiffness, creep resistance, dimensional stability, and warpage and deformation properties.

There are no particular limitations on the process for the production of the copolyamide resin used in a composition of the present invention. It may be produced easily by ordinary melt polymerization, which consists of preparing a prepolymer and subjecting the prepolymer to solid-phase polymerization or melt-mixing in an extruder to increase the degree of polymerization. The prepolymer is prepared by heating at 150°-320° C. an aqueous solution containing 6T salt (a salt formed from hexamethylenediamine and terephthalic acid) and 66 salt (a salt formed from hexamethylenediamine and adipic acid) or containing 6T salt and ε-caprolactum or 6-aminocaproic acid or both. An alternative process consists of subjecting 6T salt and 66 salt (or 6-aminocaproic acid) directly to solid-phase polymerization at a temperature lower than the melting point.

The copolyamide resin of the present invention may have incorporated in it a variety of additives such as a viscosity modifier, pigment, dye, antioxidant, and heat resistance improver, in such amounts that they do not harm its characteristic properties.

The resin composition of the present invention contains a flame-retardant designated as component (B). It is a flame-retardant based on halogenated polystyrene and/or halogenated poly-phenylene ether containing 50–70% by weight of halogen and having a weight-average molecular weight higher than 5000, preferably higher than 20,000, and more preferably higher than 28,000. An adequate amount of the flame-retardant in the composition is 5–35% by weight. With a weight-average molecular weight lower than 5000, the flame-retardant has an adverse effect on the appearance of the molded item and increases the weight the resin composition loses on heating. With an amount less than 5% by weight, the flame-retardant does not produce the desired flame retardancy. Conversely, with an amount in excess of 35% by weight, the flame-retardant has an adverse effect on the mechanical properties such as impact strength.

In a composition according to the present invention, the halogen-containing flame-retardant is used in combination with an auxiliary flame-retardant designated as component (C). The auxiliary flame-retardant is a specific metal oxide which is selected from the group consisting of antimony oxide, sodium antimonate, tin oxide, iron oxide and zinc oxide. Most effective among these metal oxides is antimony oxide. An adequate amount of the auxiliary flame-retardant is 1–10% by weight, preferably 2–8% by weight, to the total weight of the composition.

The resin composition of the present invention contains a reinforcing agent designated as component (D). It includes, for example, fibrous reinforcement such as glass fiber and carbon fiber, glass beads, talc, kaolin, wollastonite and mica. Preferable among them is glass fiber. Glass fibers suitable for use in the present invention are those generally used as a reinforcing agent for thermoplastics resins and thermosetting resins. Preferred glass fiber is in the form of glass rovings, glass chopped strands, and glass yarn made of continuous glass filaments 3–20 $\mu$m in diameter. The reinforcing agent should be added in an amount of 0–50% by weight, depending on the use of the molded item.

The resin composition of the present invention may have incorporated in it, one or more known additives such as a stabilizer, nucleating agent, blowing agent, auxiliary blowing agent, antistatic agent, pigment, and dye in such amounts that they do not harm its characteristic properties.

The invention will be described in more detail with reference to the following Examples and Comparative Examples. The resin compositions in Examples and Comparative Examples were examined for characteristic properties according to the following test methods.

(1) Vertical Burning Test

The test was conducted as follows according to the UL standard. A test specimen vertically clamped at its upper end is burned by the application of a standard flame to its lower end for 10 seconds. The time required for the test specimen to burn until the fire goes out is measured (the "first flame" time). Immediately after that, the test specimen is burned again by the application of a standard flame to its lower end for 10 seconds. The time required for the test specimen to burn until the fire goes out is measured (the "second flame" times). The measurements are repeated for five test specimens. The total flame time of ten measurements is designated as T, and the maximum value in ten measurements is designated as M. The test specimen is classed as V-0 if T is less than 50 seconds and M is less than 10 seconds, the flame does not reach the clamp and burning melt does not drip from the flame to an extent such that it can ignite cotton placed 12 inches below the test specimen. Likewise, the test specimen is classed as V-1 if T is less than 250 seconds and M is less than 30 seconds and the flame does not reach the clamp and burning melt does not drip from the flame to an extent such that it ignites cotton placed 12 inches below the test specimen.

(2) Appearance of Molded Item

The resin composition was injection-molded into burning test specimens, and the specimens were examined for surface roughening, bubbles, and color. The appearance is rated as good, poor, and bad according to the following criteria.
good . . . glossy, smooth surface
poor . . . less glossy, but smooth surface
bad . . . dull, rough surface (3) Blooming The burning test specimen is examined for the surface state after ageing in a hot-air oven at 140° C. for 3 days. Blooming is rated as good and bad according to the following criteria.
good . . . surface not stained
bad . . . surface considerably stained (4) Melting Point (Tm)

A sample (8–10 mg) is heated at a rate of 20° C./min in a differential scanning calorimeter (PERKIN-ELMER, Model 7) to give a melting curve. The maximum temperature on the melting curve is designated as Tm.

EXAMPLE 1

A copolyamide of 6T/66 (50/50% by weight) was prepared as mentioned below. 5.877 kg of terephthalic acid, 6.377 kg of an aqueous 64.5 wt. %-solution of hexamethylenediamine, 10.000 kg of 66 salt and 6.307 kg of ion-exchanged water were put in a batch-type pressure polymerizer, which was then fully substituted by nitrogen. Then, the monomers were polymerized under heat and under steam pressure of 17.5 kg/cm$^2$-G. After the polymerization system was heated up to 220° C. over a period of 2 hours with stirring, polymerization reaction was further continued for one hour at a temperature of 220°–240° C. Then stirring was stopped, and a prepolymer condensate was ejected out from the polymerizer into water owing to the pressure difference of 17.5 kg/cm$^2$-G. The thus obtained prepolymer condensate had a viscosity of $\eta r = 1.17$ and a melting point of 224° C.

The prepolymer was dried in vacuum at 100° C. for 24 hours, then put in a kneader (Model DS 3-7.6, manufactured by Moriyama Manufacturing Co.), and heated up to 250° C. over a period of about 2 hours with blowing nitrogen thereinto (3 liter/min). This was aged for further 3 hours at 250° C. and then cooled to room temperature. As a result, a white powdery polymer having a viscosity of $\eta r = 2.70$ and a melting point of 295° C. was obtained. 58% by weight of the white powdery polymer, 30% by weight of glass fiber chopped strands each having a length of 3 mm and a diameter of 13 μm, 10% by weight of "Pyro-chek" 68PB and 2 parts by weight of antimony trioxide were dry-blended and thereafter melted and blended by the use of a 30 mm-vent type biaxial screw extruder under the condition of a cylinder temperature of 260°-330° C. The resulting blend was shaped with an injection-moulding machine to form test pieces. The thus obtained test pieces were evaluated and the results are shown in Table 1 below.

EXAMPLES 2 TO 10

In each example, a resin composition was prepared from a copolyamide (in pellet form), glass fiber, flame-retardant, and auxiliary flame-retardant according to the formulation shown in Table 1.

The copolyamide is any one of 6T/66 (50/50% by weight), 6T/6 (80/20% by weight), 6T/6 (70/30% by weight), and 6T/6 (60/40% by weight).

The glass fiber is in the form of chopped strands, 3 mm long and 13 μm in diameter.

The flame-retardant is any one of brominated polystyrene, brominated polyphenylene ether.

The auxiliary flame-retardant is antimony trioxide.

All the components were mixed by melting at 260°-335° C. (cylinder temperature) using a 30-mm vented twin-screw extruder. The resulting mixture (in pellet form) was formed into test pieces by injection molding. The test pieces were examined for appearance, blooming, and flammability. The results are shown in Table 1.

COMPARATIVE EXAMPLES 1 TO 10

In each comparative example, a resin composition was prepared in the same manner as in Examples from a copolyamide, glass fiber, flame retardant, and auxiliary flame-retardant according to the formulation shown in Table 2.

The copolyamide is the same as that used in Examples.

The glass fiber is the same as that used in Examples.

The flame-retardant is any one of brominated polycarbonate, perchlorocyclopentadecane, tetrabromobisphenol A (oligomer), and brominated epoxy.

The auxiliary flame-retardant is antimony trioxide.

The resin composition was made into test pieces, which were evaluated in the same manner as in the Examples. The results are shown in Table 2.

The resin composition incorporated with perchlorocyclopentadecane did not give good pellets on account of considerable thermal decomposition in the case where the copolyamide was 6T/66 (50/50% by weight) or 6T/6 (80/20% by weight) which needs a high temperature for melt-mixing.

COMPARATIVE EXAMPLES 3 AND 4

The resin composition based on 6T/6 (60/40% by weight) and incorporated with perchlorocyclopentadecane did not meet the requirements for V-0 class. (Comparative Example 10)

The resin composition incorporated with tetrabromobisphenol-A did not meet the requirements for V-0 class.

COMPARATIVE EXAMPLES 5 AND 6

The resin composition incorporated with brominated polycarbonate did not give good test pieces on account of considerable thermal decomposition and blowing in the melt-mixing step. (Comparative Examples 1, 2 and 9)

The resin composition incorporated with brominated epoxy did not give good pellets on account of excessive viscosity increase caused by gelation that took place in the melt-mixing step. (Comparative Examples 7 and 8)

TABLE 1

| Example No. | 1 | 2 | 3 | 4 | 5 | 6 | 7 | 8 | 9 | 10 |
| --- | --- | --- | --- | --- | --- | --- | --- | --- | --- | --- |
| Copolyamide | | | | | | | | | | |
| 6T/66 (50/50% wt %) | 58 | 47 | 52 | 49 | — | — | — | — | — | — |
| 6T/6 (80/20 wt %) | — | — | — | — | 49 | 38 | — | — | — | — |
| 6T/6 (70/30 wt %) | — | — | — | — | — | — | 38 | 49 | 49 | — |
| 6T/6 (60/40 wt %) | — | — | — | — | — | — | — | — | — | 58 |
| Glass Fiber[*1] | 30 | 40 | 10 | 30 | 30 | 40 | 25 | 40 | 25 | 30 |
| Flame retardant | | | | | | | | | | |
| Brominated polystyrene | 10[*2] | 10[*4] | 30[*4] | — | — | 16[*4] | — | — | — | — |
| Brominated polyphenylene ether[*3] | — | — | — | 16 | 16 | — | — | 16 | 16 | — |
| Auxiliary flame retardant $Sb_2O_3$ | 2 | 3 | 8 | 5 | 5 | 6 | 6 | 6 | 6 | 6 |
| Melting point of copolyamide (°C.) | 295 | 295 | 295 | 295 | 315 | 315 | 305 | 305 | 305 | 270 |
| Appearance | good | good | good | good | good | good | good | good | good | good |
| Blooming | good | good | good | good | good | good | good | good | good | good |
| Burning test (1/16 in) | | | | | | | | | | |
| T (seconds) | 10.4 | 9.4 | 13.4 | 12.0 | 12.0 | 14.0 | 12.2 | 14.0 | 12.5 | 11.8 |
| M (seconds) | 1.1 | 1.0 | 2.4 | 1.6 | 1.7 | 2.2 | 2.4 | 2.2 | 2.7 | 2.3 |
| Flammability | V-0 | V-0 | V-0 | V-0 | V-0 | V-0 | V-0 | V-0 | V-0 | V-0 |

Note to Table 1
[*1] Glass fiber chopped strand (3 mm, 13 μm in dia.)
[*2] "Pyro-chek" 68-PB (Nissan Ferro Co., Ltd.)
[*3] "GLC" PO-64P (Great Lakes Chemicals Co., Ltd. and Miki Sangyo Co., Ltd.)
[*4] "PS-3B" (Nippon Kayaku Co., Ltd.)

TABLE 2

| Comparative Example No. | 1 | 2 | 3 | 4 | 5 | 6 | 7 | 8 | 9 | 10 |
| --- | --- | --- | --- | --- | --- | --- | --- | --- | --- | --- |
| Copolyamide | | | | | | | | | | |
| 6T/66 (50/50% wt %) | 49 | — | 49 | — | — | — | — | — | — | — |
| 6T/6 (80/20 wt %) | — | 49 | — | 49 | 49 | — | — | — | — | — |
| 6T/6 (70/30 wt %) | — | — | — | — | — | 49 | 49 | 48 | — | — |

TABLE 2-continued

| Comparative Example No. | 1 | 2 | 3 | 4 | 5 | 6 | 7 | 8 | 9 | 10 |
|---|---|---|---|---|---|---|---|---|---|---|
| 6T/6 (60/40 wt %) | — | — | — | — | — | — | — | — | 49 | 48 |
| Glass fiber*1 | 30 | 30 | 30 | 30 | 25 | 30 | 30 | 30 | 30 | 30 |
| Flame retardant | | | | | | | | | | |
| Brominated polycarbonate*2 | 16 | 16 | — | — | — | — | — | — | 16 | — |
| Perchlorocyclopentadecane*3 | — | — | 16 | 16 | — | — | — | — | — | 16 |
| Brominated epoxy*4 | — | — | — | — | — | — | 16 | 16 | — | — |
| Tetrabromobisphenol-A*5 | — | — | — | — | 20 | 16 | — | — | — | — |
| Auxiliary flame retardant $Sb_2O_3$ | 5 | 5 | 5 | 5 | 6 | 5 | 6 | 5 | 5 | 5 |
| Appearance | NM | NM | NM | NM | good | good | NM | NM | NM | poor |
| Blooming | — | — | — | — | good | good | — | — | — | poor |
| Burning test (1/16 in) | | | | | | | | | | |
| T (seconds) | — | — | — | — | 50.2 | 54.2 | — | — | — | 55.2 |
| M (seconds) | — | — | — | — | 11.5 | 12.3 | — | — | — | 12.8 |
| Flammability | — | — | — | — | V-1 | V-1 | — | — | — | V-1 |

Note to Table 2
*1 Glass fiber chopped strand (3 mm, 13 μm in dia.)
*2 Brominated polycarbonate "FR-34" (Mitsubishi Gas Kagaku Co., Ltd.)
*3 Perchlorocyclopentadecane "Dechloran-plus" (Oxydental Chemical Co., Ltd.)
*4 Brominated epoxy "HR-128F" (Hitachi Kasei Co., Ltd.)
*5 "Platerm" FR500 (Dianippon Ink & Chemicals Co., Ltd.)
NM: not moldable

We claim:

1. A Flame-retardant nylon resin composition which comprises, by weight to the total weight of the composition;
   - (A) 30–90% by weight of a nylon copolymer comprising 80–20% by weight of units derived from hexamethylene terephthalamide and 20–80% by weight of units derived from hexamethylene adipamide and/or caproamide,
   - (B) 5–35% by weight of a flame-retardant polymer comprising a halogenated polystyrene and / or halogenated polyphenylene ether which polymer contains 50–70% by weight of halogen and has a weight-average molecular weight of at least 5000,
   - (C) 1–10% by weight of at least one auxiliary flame-retardant selected from the group consisting of antimony oxide, sodium antimonate, tin oxide, iron oxide, and zinc oxide, and
   - (D) 0–50% by weight of reinforcing agent.

2. The flame-retardant nylon resin composition as claimed in claim 1, in which the nylon copolymer comprises (a) 80–20% by weight of units derived from hexamethylene terephthalamide and (b) 20–80% by weight of units derived from hexamethylene adipamide.

3. The flame-retardant nylon resin composition as claimed in claim 1, in which the flame-retardant is a halogenated polystyrene.

4. The flame-retardant nylon resin composition as claimed in claim 3, in which the auxiliary flame-retardant is at least one selected from antimony oxide and zinc oxide.

5. The flame-retardant nylon resin composition as claimed in claim 4, in which the nylon copolymer comprises (a) 80–60% by weight of units derived from hexamethylene terephthalamide and (c) 20–40% by weight of units derived from caproamide.

6. The flame-retardant nylon resin composition as claimed in claim 1, in which the nylon copolymer is one as prepared by first forming a prepolymer condensate having a relative viscosity of 1.20 or less and a melting point of 250° C. or lower and then solid-polymerizing the prepolymer condensate at a temperature falling within the range of from 150° C. to the melting point of the nylon polymer.

7. A flame-retardant nylon resin composition which comprises, by weight to the total weight of the composition;
   - (A) 30–90% by weight of a nylon copolymer comprising 80–20% by weight of units derived from hexamethylene terephthalamide and 20–80% by weight of units derived from hexamethylene adipamide and/or caproamide,
   - (B) 5–35% by weight of a flame-retardant polymer comprising a halogenated polystyrene and/or halogenated polyphenylene ether which polymer contains 50–70% by weight of halogen and has a weight-average molecular weight of at least 5000,
   - (C) 1–10% by weight of at least one auxiliary flame-retardant selected from the group consisting of antimony oxide, sodium antimonate, tin oxide and iron oxide, and
   - (D) 0–50% by weight of reinforcing agent.

* * * * *

UNITED STATES PATENT AND TRADEMARK OFFICE
CERTIFICATE OF CORRECTION

PATENT NO. : 5,258,439
DATED : November 2, 1993
INVENTOR(S) : Osamu Togashi et al It is certified that error appears in the above-indentified patent and that said Letters Patent is hereby corrected as shown below:

In Column 4, Line 62, delete "6" and substitute --5--.

Signed and Sealed this

Third Day of May, 1994

*Attest:*

BRUCE LEHMAN

*Attesting Officer*     *Commissioner of Patents and Trademarks*